United States Patent Office 3,077,792
Patented Feb. 19, 1963

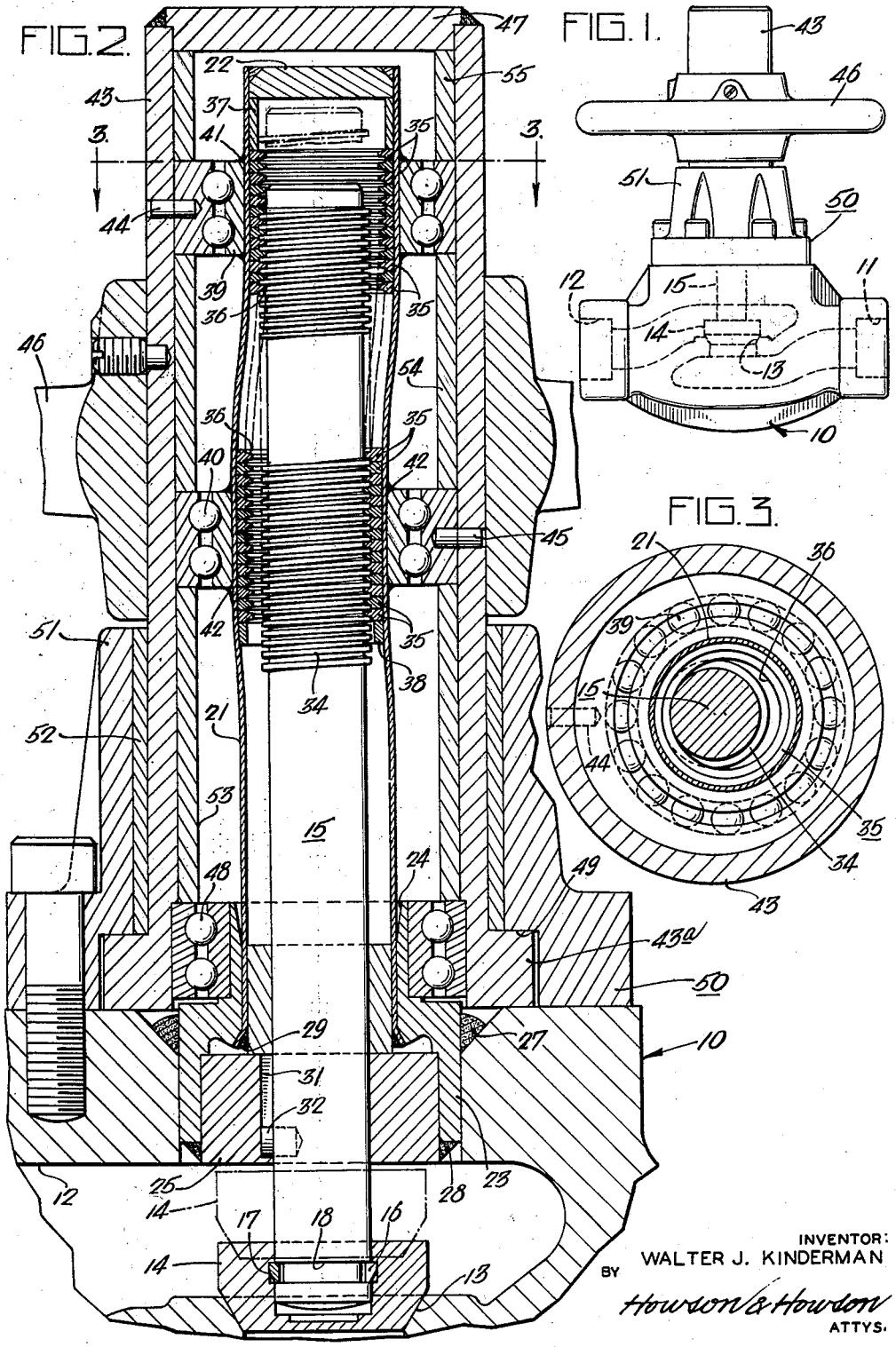

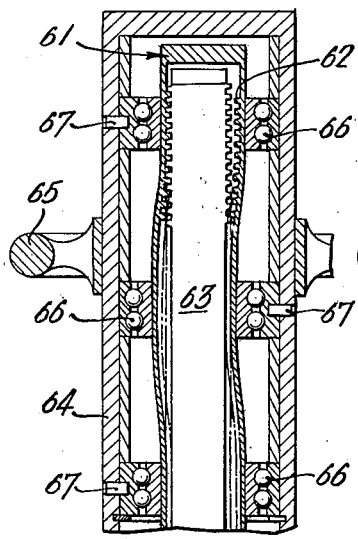

3,077,792
TRANSMISSION MECHANISM
Walter J. Kinderman, Philadelphia, Pa., assignor to Yarnall-Waring Company, Philadelphia, Pa., a corporation of Pennsylvania
Filed Mar. 11, 1960, Ser. No. 14,383
22 Claims. (Cl. 74—640)

The present invention relates to new and useful improvements in transmission mechanism, and more particularly to new and useful improvements in mechanism operable to transmit motion or forces through a continuous flexible wall.

A primary object of the present invention is to provide novel transmission mechanism of the type described wherein motion may be transmitted through a continuous wall without any mechanical connecting linkage or the like passing through the wall. This mechanism is ideally suited for transmitting motion to a valve stem or piston wherein the fluid in the valve or cylinder is hermetically sealed and the motion is transmitted through a continuous thin walled tube with the result that it is impossible for the fluid to escape or become contaminated. Additionally, this mechanism may be used in connection with a pump wherein a continuous thin walled tube is progressively deformed against a central stem or core to pump fluid continuously along the stem.

Another object of the present invention is to provide novel transmission mechanism wherein rotary movement of one member is translated into longitudinal movement of another member, for example, the stem of the valve, and wherein the stress applied to the stem may be distributed uniformly along the stem.

A still further object of the present invention is to provide novel transmission mechanism having an extremely high mechanical advantage so that a torque exerted on a rotary member may be converted into longitudinal movement of a valve stem or the like and wherein the valve stem may be operated to force a valve element against a valve seat under extremely high pressure.

Still a further object of the present invention is to provide a novel transmission mechanism of the type described having the features and characteristics set forth which is of relatively simplified construction, may be manufactured easily and cheaply, and is entirely efficient and effective in operation and use.

A further object of the present invention is to provide a novel transmission of axial motion to a fluid within a containing tubular wall thereby performing a pumping function within the confined space in response to external rotary movement about the axial confines.

These and other objects of the present invention and the various features and details of the operation and construction thereof are hereinafter more fully set forth and described with reference to the accompanying drawings, in which:

FIG. 1 is a side elevational view of a valve having secured thereto transmission mechanism made in accordance with the present invention operable to control movement of the valve stem;

FIG. 2 is an enlarged fragmentary longitudinal sectional view of the motion transmission mechanism of the present invention as applied to the valve of FIG. 1;

FIG. 3 is a transverse sectional view taken on line 3—3, FIG. 2;

FIG. 4 is a schematic longitudinal sectional view of a modified form of transmission mechanism of the present invention;

FIG. 5 is a schematic longitudinal sectional view of a further modified form of transmission mechanism of the present invention;

FIG. 6 is a schematic longitudinal sectional view of a further modified form of transmission mechanism of the present invention;

FIG. 7 is a schematic longitudinal sectional view of a further modified form of transmission mechanism of the present invention; and FIG. 8 is a schematic longitudinal sectional view of a still further modified form of transmission mechanism of the present invention.

Referring more specifically to the drawings and particularly to the embodiment of the present invention illustrated in FIGS. 1 to 3, inclusive, the motion transmission mechanism of the present invention is illustrated in conjunction with a valve, being operable to move a valve stem longitudinally to open or close the valve. It will be readily understood, however, that this motion transmission mechanism may be used in connection with devices other than valves and that the valve shown is merely illustrative of one function of the mechanism of the present invention. As illustrated, the motion transmission of the present invention is applied to a valve comprising a valve body 10 having conventional inlet and outlet openings 11 and 12 therein, with a valve seat 13 positioned intermediate the inlet and outlet openings which is adapted to be engaged by a valve disc 14 in order to close the valve and prevent passage of fluid therethrough. The valve disc 14 is removably secured to the lower end of a valve stem 15, for example, by means of a split ring 16 which fits within an annular recess 17 in the valve disc and engages an annular recess 18 formed at the lower end of the valve stem 15 to lock the valve stem within the central cavity of the valve disc. This construction causes the valve disc to be moved longitudinally with the valve stem while permitting a slight rocking motion of the valve disc relative to the valve stem.

In accordance with the present invention the valve stem is positioned within an enclosed tube which in turn is fixed to the valve body to provide a hermetically sealed area about the valve stem and prevent any leakage of fluid from the valve along the stem. Additionally, motion is imparted to the valve stem through the hermetically sealed tube without any mechanical linkage passing through the tube. To accomplish this, a sealed flexible tube 21, formed for example, of flexible stainless steel is mounted about the valve stem with the tube terminating above the upper end of the valve stem. The upper end of the tube 21 is sealed, for example, by means of a plug 22 which may be welded or otherwise secured to the tube 21. The open lower end of the tube 21 is secured within the central opening of a tube base 23 formed, for example, as illustrated at FIG. 2 of the drawings consisting of an elongated annular ring having an outwardly flared portion 24 at the upper end of the central opening. The tube base 23 in turn carries an annular valve stem guide 25 which surrounds the lower valve end of the valve stem 15. In order to eliminate the possibility of any leakage from the valve body to the exterior of the valve along the valve stem the tube base is welded to the valve body entirely about its periphery, for example, as indicated at 27, while the tube 21, tube base 23, and valve stem guide are welded together as indicated at 28 and 29. The valve stem guide serves to prevent rotation of the valve stem and limit movement of the valve stem to an axial direction. This is accomplished, for example, by providing a keyway 31 within the valve stem guide which is engaged by a key 32 secured to the valve stem.

An important feature of the present invention resides in the means for causing axial movement of the valve stem 15. This is accomplished by providing threads of different pitch on the interior of the flexible tube 21 and the exterior of the valve stem 15 and causing progressive contact in a circumferential direction between the valve stem and tube 21 at least in one position along the length of the stem. The differential pitch between the threads on the valve stem and the threads on the interior surface of the flexible tube 21 may be provided in any desired manner, for example, a left hand thread may be provided on one of the members and a right hand thread on the other member, or the threads on both members may be either left handed or right handed but of different pitch. A preferred form, however, is to provide a conventional thread along the length of the valve stem with a thread of zero-pitch formed interiorly of the tube so that upon progressive contact of the valve stem by the tube circumferentially of the valve stem, the valve stem is caused to move axially. The difference in pitch between the threads on the stem and the threads on the tube is limited however to a whole number multiple of the tooth spacing as the threads must mesh at the point of engagement between the stem and the tube.

In the embodiment illustrated in FIGS. 1 to 3 of the drawings the valve stem 21 has a continuous thread formed thereon as indicated at 34 while a thread of zero-pitch is provided along the inner periphery of the tube 21 by positioning a series of rings 35 within the tube for substantially its entire length, the rings 35 each having an annular thread shaped projection 36 formed about their inner periphery operable to be engaged by and mesh with the threads 34 on the valve stem 15. As illustrated, the series of rings 35 positioned with the flexible tube 21 are stacked one on top of another and terminate short of the top and bottom of the tube with a spacer 37 being provided at the top of the tube abutting the tube plug 22 and a support ring 38 welded or otherwise secured within the tube at the lower end of the rings 35 to prevent longitudinal movement of the rings 35 relative to the tube 21. With this construction, upon progressive contact of any one of the rings 35 circumferentially about the threads 34 of the valve stem 15, the valve stem is caused to move upward or downward axially depending upon the direction of advancement of the contact and the direction of pitch of the thread 34 on the valve stem.

To provide the maximum area of contact between the threads 34 and 36 and to permit the threads 34 and 36 to move gradually into and out of contact with one another as the tube 21 is flexed, the side surface of the threads 34 and 36 are tapered or chamfered as indicated in FIG. 2. This permits the threads to initially come into partial engagement with one another in a surface to surface contact and gradually reach the point of full engagement at the area of maximum deflection of the tube 21 therefore providing a favorable load distribution over the maximum permissible contact area.

Progressive engagement between the teeth of the rings 35 and the thread on the valve stem is accomplished in the embodiment of the present invention illustrated in FIGS. 1 to 3 of the drawings by means of means engaging the exterior of the tube and causing the tube to be flexed with the engaged portion of the tube being translated in a circular path having its center concentric with the longitudinal axis of the valve stem. With reference to FIGS. 1, 2, and 3 of the drawings, a pair of bearings 39 and 40 are provided having their inner races fixed to the tube 21, for example, by welding as indicated at 41 and 42. The outer races of the bearings 39 and 40 have their peripheral surface eccentric with respect to the inner peripheral surface of the inner races with the eccentricity of the two bearings 39 and 40 being spaced 180° apart from one another. With the bearings in the position as illustrated in FIG. 2 the upper end of the tube 21 is displaced to the right with respect to the stem while the central portion of the tube 21 is displaced to the left with respect to the stem causing the teeth at the upper portion of the tube to engage the left hand side of the threads of the upper part of the stem and the teeth at the central part of the tube to engage the right hand side of the threads of the central part of the stem. Upon rotation of the outer races of the bearings 39 and 40 in the same direction about the axis of the stem, the point of contact between the teeth 36 of the tube and the threads 34 of the stem progresses about the stem in the direction of rotation of the outer bearing races. This in turn causes the teeth 36 of the tube 21 to, in effect, ride up or down the threads of the stem, depending upon the relative direction of rotation of the outer bearing races and the direction of pitch of the threads of the stem. However, since the tube 21 is fixed the progressive contact between the teeth 36 and the threads of the stem will cause the stem to be raised or lowered as desired.

Rotation of the outer races of the bearings 39 and 40 is caused by interconnecting the outer bearing races with an outer casing 43 which is mounted on top of the valve body for rotation about the axis of the valve stem. A pair of pins 44 and 45 may be provided extending through the wall of the outer casing 43 into openings in the outer peripheral surface of the outer bearing races of the bearings 39 and 40, respectively, in order to interconnect the outer bearing races with the casing and cause a positive drive of the outer bearing races. The casing in turn may be rotated in any suitable manner, for example, by means of a hand wheel 46 fixed to the casing. If desired, the upper end of the casing 43 may be closed, for example, by means of a plug 47 welded or otherwise secured to the casing 43.

Mounting of the casing 43 for free rotary movement may be accomplished by providing a bearing 48 on the upper end of the tube base 23 which engages a shoulder on the tube base and is engaged against the inner periphery of the casing 43 thereby positioning the casing 43 in the desired coaxial relation with respect to the valve stem. An outwardly projecting flange 43a is formed integrally with the casing 43 at the lower end of the casing which is engaged beneath a shoulder 49 on a bonnet 50 with the bonnet in turn being bolted or otherwise secured to the valve body 10. The bonnet 50 has an upwardly extending annular flange 51 formed integrally therewith which surrounds the lower portion of the casing 43 and a bearing or bushing 52 is positioned between the annular flange 51 of the bonnet and the casing 43 to permit free rotation of the casing. When the bearings 39 and 40 are initially inserted within the casing 43 a first bearing spacer 53 may be provided between the upper surface of the bearing 47 and the lower surface of the central bearing 40 to properly position the central bearing 40 and a second bearing spacer 54 may be positioned between the bearing 40 and the bearing 39 to position the bearing 39. Additionally, the third bearing spacer 55 may be provided above the bearing 39 and in engagement with the plug 46 to carry any thrust exerted on the bearings.

With the above described construction, when it is desired to move the valve stem and valve element from the closed position as illustrated in full lines in FIG. 2 of the drawings to the open position, the handle 46 is rotated in the clockwise direction as viewed from the top of FIG. 2 thereby progressively moving the point of engagement of the teeth 36 of the tube 21 and the threads of the valve stem in a clockwise direction about the valve stem causing the valve stem to be moved upwardly to open the valve. In order to close the valve the operating handle is rotated in the opposite direction. This construction provides a considerable mechanical advantage with a relatively small force on the valve handle exerting a considerable longitudinal thrust on the valve element and valve stem permitting the valve to be easily closed under a high pressure.

As illustrated in the drawings, the valve stem is shown as having a right hand thread on it while the teeth on the flexible tube have a zero-pitch. It will be understood, however, that the valve stem may be provided with a left hand thread so that in order to operate the valve in the direction of rotation of the handle will be in the opposite direction from that described above. Additionally, it will be readily apparent that a thread having other than a zero pitch may be provided on the tube 21 with the threads on the valve stem having either a zero pitch or a positive pitch in either the right hand or left hand direction and that the valve will operate in the same manner as described above. The only limitation in the pitch of the threads on the tube and valve stem is that these threads must have a different pitch so that movement of the stem occurs upon contact between the teeth 36 and the threads 34 of the valve stem.

FIGS. 4 to 8, inclusive, of the drawings illustrate schematically several of the various modified forms of the motion transmitting mechanism of the present invention. In these embodiments, various means for creating the desired contact between a stem and tube are illustrated together with different types of contact.

For example, in the embodiment illustrated in FIG. 4, a resilient closed tube 61 having a plurality of teeth 62 thereon is provided surrounding a straight cylindrical threaded stem 63. An outer casing 64 surrounds the tube 61 and is mounted for rotary movement about the axis of the stem 63 in a manner similar to the casing 53 of the embodiment illustrated in FIGS. 1, 2, and 3 of the drawings with a hand wheel 65 provided to cause rotary movement of the casing 64. In this embodiment of the present invention three eccentric bearings 66 are provided, one in engagement with the top of the tube, one in engagement with the midportion of the tube and one in engagement with the bottom of the tube. The eccentricity of the upper and lower bearings 66 is displaced 180° from the eccentricity of the middle bearing 66 so that the teeth 62 of the tube 61 engage threads of the stem 63 at one side of the stem at the upper and lower portion of the stem and at the opposite side of the stem in the midportion of the stem. This distributes the force on the threads of the stem at three different locations along the length of the stem thereby providing a greater number of teeth on which the thrust is exerted than in the embodiment of FIG. 2. Each of the bearings 66 are interconnected with the outer casing 64 for example, by means of pins 67 so that the outer races of the bearings 66 are rotated along with the casing 64. Preferably, the distance between the central and upper bearings is approximately twice the distance between the central and lower bearings so that the bending moment exerted on the stem is substantially uniform along the entire length of the stem.

A further embodiment of the present invention is illustrated schematically in FIG. 5 of the drawings wherein a flexible tube 71 having a plurality of teeth 72 thereon is provided surrounding a straight cylindrical threaded stem 73. A casing 74 is mounted for rotary movement about an axis coaxial with the axis of the stem 73 in a manner similar to that shown in the form of the invention of FIG. 2 with a hand wheel 75 being provided to cause rotation of the casing 74. In this embodiment of the present invention, there is a continuous contact throughout the length of the stem between the teeth 72 of the flexible tube 71 and the threads of the stem 73. This continuous contact follows the path of a helix surrounding the stem and is accomplished in the present embodiment by means of a series of closely spaced eccentric bearings 76 with the eccentricity of each bearing 76 being displaced circumferentially a slight amount from the next adjacent bearing and each bearing along the length of the tube being displaced the same amount from its next adjacent bearing in the same direction. The bearings 76 are interconnected with the outer casing, for example, by means of pins 77 which engage the outer race of the bearings and the casing so that the outer races of the bearings are caused to rotate along with the casing 74. With this construction each of the teeth along the length of the tube are in engagement with a portion of the threads on the stem thereby providing a greater number of teeth to support the axial thrust exerted on the stem and increasing the maximum allowable thrust which may be exerted on the stem.

Still a further embodiment of the present invention is illustrated in FIG. 6 of the drawings wherein an outer casing 81 having a plurality of teeth 82 thereon is provided surrounding a threaded stem 83. The outer casing 81 is mounted for rotary movement coaxially of the stem 83, for example, by means of a pair of bearings 84, 84 carried by a fixed sleeve 85. A hand wheel 86 may be secured to the casing 81 to cause rotary movement of the casing. In this embodiment of the present invention the casing 81 has a central bore 87 therein which is shaped in the form of a helix or spiral uniformly about the central axis of the casing with the teeth 82 being secured within the central helical bore. With this construction, as the casing 81 is rotated about the axis of the stem 83 contact between each individual tooth 82 of the casing and the threads of the stem 83 is progressively advanced about the periphery of the stem 83. In this embodiment, as in the embodiment of FIG. 5, there is engagement between the teeth 82 of the casing 81 and the threads of the stem 83 for the entire length of that portion of the stem 83 within the casing 81, the point of contact between the teeth 82 and the threads of the stem 83 being displaced axially from the point of contact between the next adjacent tooth 82 and the threads of the stem 83.

In the embodiment of the present invention illustrated in FIG. 7 of the drawings there is provided a valve body 91 having a seat 92 adapted to be engaged by a valve element 93. The valve element 93 in turn is secured to the lower end of a hollow valve stem 94 which has a central bore 95 therein on which a thread 96 is provided. The hollow valve stem 94 is mounted for longitudinal sliding movement and prevented from rotary movement within a hollow tubular neck portion 97 which may be formed integrally with the valve body 91. In this embodiment of the present invention an operating rod extends longitudinally of the neck portion 97 of the valve body and terminates at its lower end within the bore of the hollow valve stem 94 with the operating rod 98 being fixed to the hub 99 of a hand wheel 100 which is mounted for rotary movement about the top of the member 97. The lower end of the operating rod 98 is bent or deformed as illustrated at FIG. 7 in a generally S-shape with a flexible tube 101 being provided about the lower end of the operating rod. The tube 101 is secured, for example, by means of welding to a tube base 102 which in turn is fixed, for example, by means of welding to the upper end of the valve neck portion 97.

A plurality of teeth 103 are provided about the bent end of the lower end of the flexible tube which are adapted to engage the threads 96 of the valve stem 94. A differential pitch is provided between the teeth 103 on the flexible tube 100 and the threads 96 of the valve stem 94. With his above described construction, upon rotation of the operating rod about its central axis contact between the teeth 103 and the threads 96 of the valve stem is caused to progressively advance about the inner periphery of the valve stem with the differential pitch between the teeth 101 and the threads 96 causing longitudinal sliding movement of the valve stem.

Still a further embodiment of the present invention is illustrated in FIG. 8 of the drawings wherein a flexible tube 110 is provided surrounding a stationary cylindrical stem 111. In this embodiment of the present invention instead of motion being imparted through the stem 111 the stem 111 is secured to a stationary base member 112 and a contact between the flexible tube and stem is caused to progress upwardly along the length of the stem in a helical direction thereby acting as a pump to force fluid to flow into the interior of the tube 110 through an inlet opening 113 and outwardly from the upper end of the tube 110 through an outlet opening 113a. The continuous progressive contact helically along the length of the stem between the flexible tube 110 and the stem 111 is caused in the present embodiment of the invention by means of a spiral wire or rod 114 which is secured to the inner wall of a cylindrical casing 115 with the wire contacting and inwardly deforming the tube along a spiral path for the entire length of the tube so that the tube contacts the stem in a spiral path progressing longitudinally along the stem. The casing 115 may be rotatably mounted within an outer cylindrical support 116 carried by the base 112, by means of a pair of bearings 117, 117 and rotary motion may be imparted to the casing 115, for example, by means of a drive pinion 118 which engages a drive gear 119 secured to the upper end of the casing 115. With the above construction, upon rotation of the casing 115 the spiral contact between the tube 110 and the stem 111 is caused to progress uniformly and continuously along the length of the stem 111 thereby providing a pumping action which will force a fluid inside of the flexible tube 110 longitudinally along the stem 111 from the inlet opening 112 to the outlet opening 113. It will be understood, however, that any of the above described embodiments wherein a continuous progressive contact is provided helically along the stem between the flexible tube and the stem may be used to accomplish the pumping action of the embodiment of FIG. 8. This pump does not work as a positive displacement pump but imparts a velocity component to the fluid to force the fluid through the pump. In order for the pump to work efficiently the tube must be flexed rapidly by rotating the casing 115 about the tube at a high rate of speed.

From the above it will be seen that the present invention provides novel transmission mechanism which is operable to transmit motion or forces continuously through an unbroken wall to permit motion, for example, to be transmitted to a valve stem through the wall and providing a continuous hermetic seal about the valve stem or piston.

While particular embodiments of the present invention have been illustrated and described herein, it is not intended to limit the invention to such a disclosure and changes and modifications may be incorporated and embodied therein within the scope of the following claims.

I claim:

1. Transmission mechanism for transmitting motion or forces comprising: a first flexible thin walled tubular member, means mounting said tubular member to prevent longitudinal movement of the same, a second member telescopically mounted relative to said first member with the longitudinal axis of said second member offset relative to the longitudinal axis of the first member and at least one portion of the outer peripheral surface of one of said members in engagement with at least one portion of the inner peripheral surface of the other member, and a drive member in engagement with said first member operable to flex the same longitudinally and translate a section of said first member including said one portion thereof in a circular path, said translation causing the longitudinal axis of said first member at said section to follow a circular path about the longitudinal axis of said second member at said section to move the point of engagement between said first and second members circumferentially about said second member.

2. Transmission mechanism for transmitting motion or forces comprising: a first flexible thin walled tubular member, means mounting said first member to prevent longitudinal movement of the same, a second generally cylindrical member telescopically mounted within said first member for longitudinal movement relative to said first member with the longitudinal axis of said second member offset relative to the longitudinal axis of the first member, at least one portion of the inner peripheral surface of said first tubular member in engagement with at least one portion of the outer peripheral surface of said second member, and a drive member in engagement with said first member operable to flex the same longitudinally and translate a section of said first member including said one portion thereof in a circular path, said translation causing the longitudinal axis of said first member at said section to follow a circular path about the longitudinal axis of said second member at said section to move the point of engagement between said first and second members circumferentially about said second member.

3. Apparatus in accordance with claim 2 wherein threads are provided on the inner peripheral surface of said first member and the outer peripheral surface of said second member adapted to mesh with one another at the point of engagement between said first and second members, and wherein the threads on said first and second members have different pitches.

4. Apparatus in accordance with claim 3, wherein the threads on said first member comprise a series of closely spaced continuous rings with each ring having at least one tooth extending completely about the inner peripheral surface thereof and wherein said thread on said rings has a zero pitch.

5. Transmission mechanism in accordance with claim 2, wherein a generally cylindrical casing is rotatably mounted about said first tubular member, and means carried by said casing in engagement with said first tubular member operable to flex the same and translate said section of said first tubular member about said circular path.

6. Apparatus in accordance with claim 5, wherein said means in engagement with said first tubular member comprises a rod-like member secured to said casing and extending in a spiral path longitudinally of said casing with said rod-like member being in engagement with said tubular member for substantially the full length thereof.

7. Apparatus in accordance with claim 5, wherein said means in engagement with said first tubular member comprises at least one bearing having an inner race in engagement with said first tubular member and an outer race secured to said casing and having its outer peripheral surface eccentric with respect to the inner peripheral surface of said inner race.

8. Apparatus in accordance with claim 7, wherein a plurality of said bearing members are provided spaced longitudinally of said casing and said first tubular member with the eccentricity of each bearing member being displaced angularly with respect to the eccentricity of its next adjacent bearing member.

9. Apparatus in accordance with claim 2, wherein an outer casing is rotatably mounted about said first tubular member, and means defining a bore extending longitudinally of said outer casing in the form of a helix about the axis of said outer casing with the walls of said bore operable to engage and flex said tubing.

10. Apparatus in accordance with claim 1, wherein said second member is positioned about said first tubular member and wherein the drive member comprises an operating rod positioned within said first tubular member operable to engage and flex the same.

11. Drive means operable to actuate a valve stem or the like in a longitudinal direction comprising: means in engagement with said stem mounting said stem for longitudinal movement and operable to prevent rotary movement thereof, means defining a threaded portion on said stem, a flexible tube telescopically mounted with respect to said stem with the longitudinal axis of said flexible tube offset relative to the longitudinal axis of said stem, means defining a threaded portion on said tube confronting the threaded portion of said stem, the threads on said stem having a pitch different from the threads on said tube, a drive member in engagement with said tube operable to flex a portion of said tube longitudinally to cause engagement between the threads on said tube and the threads on said stem at a predetermined point on the periphery of said stem, and means to translate said drive member and said flexed portion of said tube in a circular path, said translation causing the longitudinal axis of said tube at said portion of said tube to follow a circular path about the longitudinal axis of said stem at said predetermined point to move the point of engagement between said tube threads and said stem threads circumferentially about said stem to thereby cause longitudinally movement of said stem.

12. Apparatus in accordance with claim 11, wherein the threads on said stem spiral longitudinally along said stem, and wherein the threads on said tube are formed by a series of closely spaced rings carried by said tube with each ring having at least one thread thereon.

13. Apparatus in accordance with claim 12, wherein the threads formed by said rings have a zero pitch.

14. Drive means operable to actuate a valve stem or the like in a longitudinal direction comprising: means in engagement with said stem mounting said stem for longitudinal movement and operable to prevent rotary movement thereof, means defining a threaded portion on said stem, a flexible thin walled tube telescopically mounted about said stem with the longitudinal axis of said tube offset relative to the longitudinal axis of the stem, mounting means for said tube anchoring one end of said tube and preventing said tube from longitudinal and rotary movement, means defining a threaded portion on said tube confronting the threaded portion of said stem, the threads on said stem having a pitch different from the threads on said tube, a generally cylindrical outer casing surrounding at least a portion of said tube, means mounting said casing for rotation about the axis of said stem, drive means to rotate said casing, and means on said casing in engagement with said tube operable to flex a portion of said tube longitudinally to cause engagement between the threads on said tube and the threads on said stem at a predetermined point on the periphery of said stem, and upon rotation of said casing to translate the flexed portion of said tube, said translation causing the longitudinal axis of said tube at said flexed portion to follow a circular path about the axis longitudinally of said stem at said predetermined point to move the point of engagement between said tube threads and said stem threads circumferentially about said stem to thereby cause longitudinal movement of said stem.

15. Apparatus in accordance with claim 14, wherein the means on said casing in engagement with said tube comprises at least one member secured to said casing engagement with the outer periphery of said tube and rotatable with said casing.

16. Apparatus in accordance with claim 14 wherein the means on said casing in engagement with said tube comprises a plurality of bearings, each of said bearings having an inner opening surrounding and engaging said tube with the inner periphery of said bearings eccentric with the outer periphery of said bearings.

17. Apparatus in accordance with claim 16 wherein a pair of bearings are provided with one of said bearings engaging and operable to flex the midpoint of said tube and the other of said bearings engaging and operable to flex the end of said tube opposite to the said anchored end.

18. Apparatus in accordance with claim 17 wherein the midpoint of said tube and the end of said tube opposite the said anchored end are flexed by said bearings simultaneously in diametrically opposite directions.

19. Apparatus in accordance with claim 16 wherein a plurality of bearings are provided in engagement with said tube spaced longitudinally from one another along said tube, and wherein the eccentricity of each of said bearings is angularly disposed with respect to the eccentricity of its next adjacent bearing.

20. Apparatus in accordance with claim 16 wherein three of said eccentric bearings are provided, one adjacent each end of said tube and one at approximately the midpoint of said tube with the eccentricity of the bearing at the midpoint of said tube being displaced angularly approximately 180° from the eccentricity of the bearings at the ends of said tube.

21. Apparatus in accordance with claim 14 wherein the means on said casing in engagement with said tube comprises at least one member extending spirally about said tube for substantially the full length thereof operable to flex said tube at the point of engagement of said member with said tube.

22. A system for the longitudinal displacement of a member, a portion of said member having formed thereon a thread of predetermined pitch, a tubular sheath surrounding said member, a thread about the internal periphery of said sheath operable to contact and engage with the thread on said member at a predetermined area, and means at the area of engagement of said sheath and member threads to translate the axis of said sheath in a circular path relative to the axis of said member by the application of radial forces to translate the area of engagement of said sheath and member threads about the peripheral surface of said member and cause movement of the member longitudinally relative to said sheath.

References Cited in the file of this patent
UNITED STATES PATENTS

| | | |
|---|---|---|
| 2,482,082 | Wahlberg | Sept. 13, 1949 |
| 2,918,827 | Brown | Dec. 29, 1959 |
| 2,943,508 | Musser | July 5, 1960 |
| 2,961,887 | Long | Nov. 29, 1960 |